No. 746,105. PATENTED DEC. 8, 1903.
E. B. KIRK.
PUZZLE.
APPLICATION FILED NOV. 20, 1902.
NO MODEL. 2 SHEETS—SHEET 1.

Witnesses
Jos. H. Blackwood
F. Randolph, Jr.

Inventor
Edward B. Kirk
by D. A. Gurick
Attorney

THE NORRIS PETERS CO., PHOTO-LITHO., WASHINGTON, D. C.

No. 746,105. PATENTED DEC. 8, 1903.
E. B. KIRK.
PUZZLE.
APPLICATION FILED NOV. 20, 1902.
NO MODEL. 2 SHEETS—SHEET 2.

Witnesses
Inventor
Edward B. Kirk
Attorney

No. 746,105. Patented December 8, 1903.

UNITED STATES PATENT OFFICE.

EDWARD B. KIRK, OF JACKSONVILLE, ILLINOIS.

PUZZLE.

SPECIFICATION forming part of Letters Patent No. 746,105, dated December 8, 1903.

Application filed November 20, 1902. Serial No. 132,145. (No model.)

*To all whom it may concern:*

Be it known that I, EDWARD B. KIRK, a citizen of the United States, residing at Jacksonville, in the county of Morgan and State of Illinois, have invented certain new and useful Improvements in Puzzles, of which the following is a specification.

My invention relates to puzzles, and has for its object to produce a puzzle consisting of a plurality of independently-movable pieces having a plurality of arches, grooves, blocks, &c., which when arranged in the correct order will indicate the solution by receiving key-pieces through or in the alined arches or grooves, or the solution may be indicated in any other desired manner.

The features of my invention will fully appear hereinafter and by reference to the accompanying drawings, in which—

Figure 1:
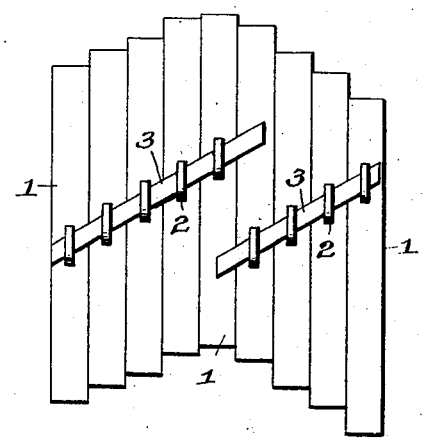
Figure 2:
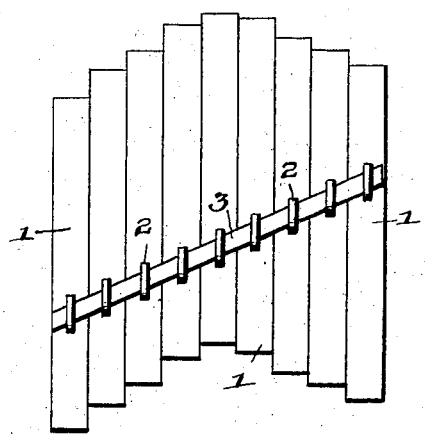
Figure 3:
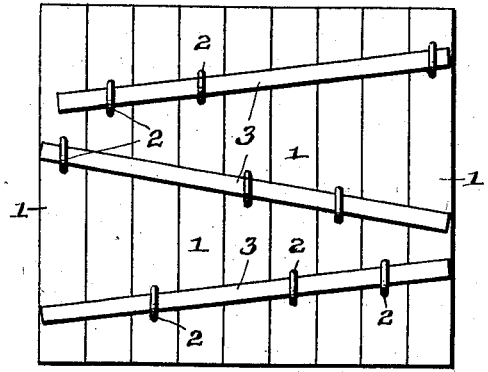
Figure 4:
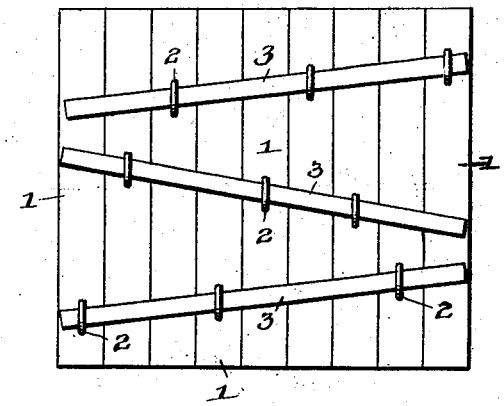
Figure 5:
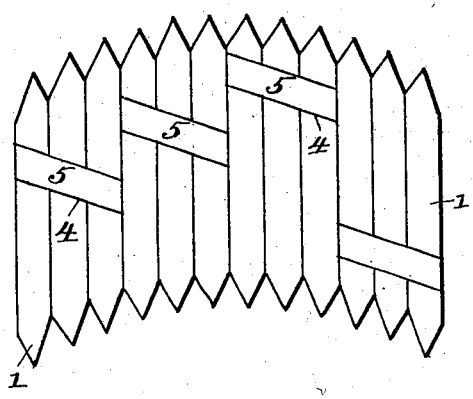
Figure 6:
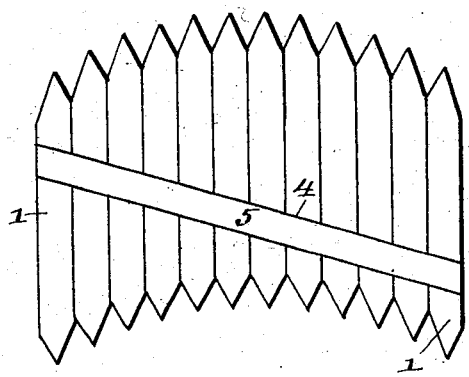
Figure 7:
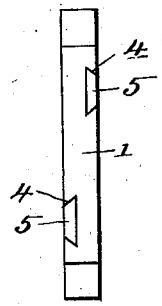

Figure 1 is a view of one side of a puzzle employing nine pieces having arches through which slides are inserted when properly arranged; Fig. 2, a view of the reverse side of Fig. 1; Fig. 3, a view of a modification of the puzzle shown in Figs. 1 and 2, in which more slides are used, Fig. 4 being a reverse view of Fig. 3; Figs. 5 and 6, views of two sides of a puzzle employing grooves instead of arches; Fig. 7, a side view of one of the pieces used in puzzle illustrated in Figs. 5 and 6; and Fig. 8, a view of a solved puzzle, showing a modification employing a multiplicity of letters on each slide that must be so arranged as to make the letters read in a prescribed order.

In the drawings similar reference characters indicate corresponding parts throughout the several views.

The puzzle consists of a number of strips of wood or other suitable material 1, having, as shown in Figs. 1, 2, 3, and 4, arches 2 secured thereon, which when arranged in the proper order, as shown in said Figs. 1, 2, 3, and 4, will receive key-pieces 3 for holding the pieces 1 in position. In Figs. 1 and 2 it will be noticed that on one side of the puzzle the arches are so positioned when the puzzle is solved that two short key-pieces will register therewith and on the other side one long one, while in Figs. 3 and 4 the arches are so arranged that three long key-pieces on each side are necessarily employed.

In Figs. 5, 6, and 7 are illustrated a puzzle employing grooves 4 cut into two sides of each slide to receive key-pieces 5. The grooves 4 may be made dovetail in shape, as shown in Fig. 7, and key-pieces 5 made with beveled edges to snugly fit them, or the edges of the groove may be perpendicular to the base, as desired.

Figure 8:
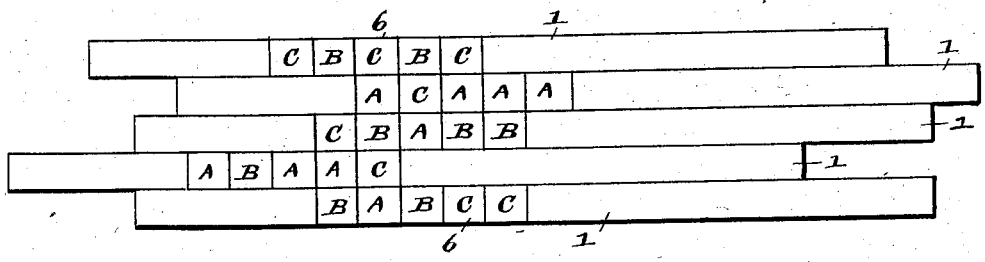

Fig. 8 illustrates another form in which letters are placed in blocks 6, the solution of the puzzle consisting in so arranging the slides that reading downward in each column of blocks from left to right the letters therein will read in a predetermined order, as illustrated in the drawings, or this may be changed to make the letters spell a sentence, quotation, &c., as desired, or numerals may be inserted instead of the letters.

My invention is readily adapted for advertising purposes in that each individual piece may be utilized for that purpose which may be read on each individual piece, or, if desired, the advertising matter on the pieces containing the arches, &c., may be sliced and not decipherable until the blocks are properly arranged.

Having thus described my invention, what I claim is—

1. A puzzle consisting of a multiplicity of strips, key-pieces, and means to secure said key-pieces to said strips, substantially as shown and described.

2. A puzzle consisting of a multiplicity of strips, arches on said strips, and key-pieces adapted to register with said arches when said strips are properly arranged so that said arches are in alinement and form slides to receive said key-pieces, substantially as shown and described.

In testimony whereof I hereto affix my signature in the presence of two witnesses.

EDWARD B. KIRK.

Witnesses:
 B. H. MERRILL,
 JESSIE L. MORRISON.